US009208365B2

(12) United States Patent
Nikitin

(10) Patent No.: US 9,208,365 B2
(45) Date of Patent: Dec. 8, 2015

(54) METHOD AND APPARATUS TO MITIGATE MULTIPATH IN RFID

(75) Inventor: Pavel Nikitin, Seattle, WA (US)

(73) Assignee: INTERMEC IP CORP., Everett, WA (US)

( * ) Notice: Subject to any disclaimer, the term of this patent is extended or adjusted under 35 U.S.C. 154(b) by 998 days.

(21) Appl. No.: 13/348,398

(22) Filed: Jan. 11, 2012

(65) Prior Publication Data

US 2012/0176227 A1    Jul. 12, 2012

Related U.S. Application Data

(60) Provisional application No. 61/432,091, filed on Jan. 12, 2011.

(51) Int. Cl.
*G06K 7/01* (2006.01)
*G06K 7/10* (2006.01)

(52) U.S. Cl.
CPC .................................. *G06K 7/10356* (2013.01)

(58) Field of Classification Search
CPC ................. G01S 13/74–13/84; G01S 13/767; G06K 7/10405; G06K 7/10475; G06K 7/10356; G06K 7/10366; G06K 7/10376; G06K 7/10386
USPC ........................ 340/5.1–5.92, 8.1, 10.1–10.6; 342/42–51, 148
See application file for complete search history.

(56) References Cited

U.S. PATENT DOCUMENTS

| 6,437,832 | B1 | 8/2002 | Grabb et al. ................... 348/614 |
| 6,882,312 | B1 | 4/2005 | Vorobiev et al. .............. 342/374 |
| 6,898,415 | B2 * | 5/2005 | Berliner et al. .............. 455/63.1 |
| 2005/0237953 | A1 * | 10/2005 | Carrender et al. ............ 370/278 |
| 2007/0063820 | A1 | 3/2007 | Kung ............................ 340/10.1 |

OTHER PUBLICATIONS

Sollenberger, T., "Multipath phase errors in CW-FM tracking systems," Antennas and Propagation, IRE Transactions on , vol. 3, No. 4, pp. 185,192, Oct. 1955. Accessed Dec. 20, 2014 http://ieeexplore.ieee.org/xpl/articleDetails.jsp?arnumber=1144322.*
Yiyang Zhao; Yunhao Liu; Ni, L.M., "VIRE: Active RFID-based Localization Using Virtual Reference Elimination," Parallel Processing, 2007. ICPP 2007. International Conference on , vol., no., pp. 56,56, Sep. 10-14, 2007 doi: 10.1109/ICPP.2007.84 Accessed Dec. 20, 2014 http://ieeexplore.ieee.org/xpls/abs_all.jsp?arnumber=4343863.*
Venilal, Bhavik. "Two Dimensional Localization of Passive Uhf Rfid Tags." Master's thesis, Wright State University, 2008. Accessed Dec. 20, 2014. https://etd.ohiolink.edu/rws_etd/document/get/wright1229465514/inline.*

(Continued)

*Primary Examiner* — Timothy A Brainard
(74) *Attorney, Agent, or Firm* — Oliff PLC; R. Brian Drozd

(57) ABSTRACT

A distance between at least one antenna of an interrogation system and a transponder, such as an RFID tag, is determined based on derivatives with respect to frequency of the phase and the signal strength of responses transmitted by the transponder and received at the at least one antenna. The derivatives of the phase and the signal strength facilitate compensating for sources of multipath interference. Determining changes in distance may further facilitate determining location, speed, or bearing of the transponder by the interrogation system.

20 Claims, 8 Drawing Sheets

(56) References Cited

OTHER PUBLICATIONS

Tesoriero, R.; Gallud, J.; Lozano, M.; Penichet, V., "Using active and passive RFID technology to support indoor location-aware systems," Consumer Electronics, IEEE Transactions on , vol. 54, No. 2, pp. 578,583, May 2008 doi: 10.1109/TCE.2008.4560133. Accessed Dec. 20, 2014. URL: http://ieeexplore.ieee.org/stamp/stamp.jsp?tp=&arnumber=4560133&isnumber=.*

Nikitin et al., "Performance Limitations of Passive UHF RFID Systems," IEEE Antennas and Propagation Symposium, Albuquerque, New Mexico, Jul. 2006, 4 pages.

Nikitin et al., "Theory and Measurement of Backscattering from RFID Tags," IEEE Antennas and Propagation Magazine, 48(6):212-218, Dec. 2006.

Nikitin et al., "Antennas and Propagation in UHF RFID Systems," IEEE RFID Conference, Las Vegas, Nevada, Apr. 2008, 12 pages.

Nikitin et al., "Harmonic Scattering from Passive UHF RFID Tags," IEEE Antennas and Propagation Symposium, Charleston, South Carolina, Jun. 2009, 4 pages.

Nikitin et al., "LabVIEW-Based UHF RFID Tag Test and Measurement System," IEEE Transactions on Industrial Electronics, 56(7):2374-2381, Jul. 2009.

Nikitin et al., "Phase Based Spatial Identification of UHF RFID Tags," IEEE RFID Conference, Orlando, Florida, Apr. 2010, pp. 102-109.

Rao et al., "Antenna Design for UHF RFID Tags: A Review and a Practical Application," IEEE Transactions on Antennas and Propagation, 53(12):3870-3876, Dec. 2005.

Tikhov, "Comments on 'Antenna Design for UHF RFID Tags: A Review and a Practical Application'," IEEE Transactions on Antennas and Propagation, 54(6):1906-1907, Jun. 2006.

* cited by examiner

METHOD AND APPARATUS TO MITIGATE MULTIPATH IN RFID

CROSS-REFERENCE TO RELATED APPLICATION

This application claims benefit under 37 U.S.C. 119(e) to U.S. patent application Ser. No. 61/432,091, filed Jan. 12, 2011, which is incorporated by reference herein in its entirety.

TECHNICAL FIELD

This disclosure generally relates to wireless transponders, for example radio frequency identification (RFID) transponders, and wireless interrogators, for example RFID interrogators or readers, and particularly relates to multipath interference between the interrogators and the transponders.

BACKGROUND INFORMATION

Wireless radio or microwave frequency interrogators, for example radio frequency identification (RFID) interrogators or readers, may be used to read information from and/or write information to transponders, for example RFID transponders, commonly referred to as RFID tags.

RFID transponders or tags may store data in a wirelessly accessible memory, and may include a discrete power source (i.e., an active RFID tag), or may rely on power derived from an interrogation signal (i.e., a passive RFID tag). RFID readers typically emit a wireless interrogation or inquiry signal that causes the RFID transponder to respond with a return wireless signal encoding the data stored in the memory. The wireless signals typically have wavelengths falling in the radio or microwave portions of the electromagnetic spectrum. Whether radio or microwave frequencies are employed, such signals are commonly referred to as RF signals. Such a convention is adopted herein and throughout the attached claims.

Identification of an RFID transponder or tag generally depends on RF energy produced by a reader or interrogator arriving at the RFID transponder and returning to the reader. Multiple protocols exist for use with RFID transponders. These protocols may specify, among other things, particular frequency ranges, frequency channels, modulation schemes, security schemes, and/or data formats.

RFID transponders typically include a semiconductor device (e.g., a chip) and one or more conductive traces that form an antenna. The semiconductor device includes an integrated circuit that typically includes memory, logic circuitry and power circuitry. Typically, RFID transponders provide information stored in the memory in response to the RF interrogation signal received at the antenna from the interrogator or reader. Some RFID transponders include security measures, such as passwords and/or encryption. Many RFID transponders also permit information to be written or stored in the memory via an RF signal.

While RFID transponders provide various types of information stored in memory, the RFID transponders are presently incapable of transmitting their own coordinates of location to interrogators. Instead, techniques such as time difference of arrival ("TDOA"), time domain phase delay on arrival ("TD-PDOA"), spatial domain phase delay on arrival ("SD-PDOA"), and frequency domain phase delay on arrival ("FD-PDOA") are used to calculate the distance between an interrogator and an RFID transponder. However, such techniques have to date typically been unsuccessful in multipath propagation environments. Multipath refers to reflections of a wireless signal that result in reception of the wireless signal at an antenna via two or more paths. Outdoor sources of multipath include the ground, the atmosphere, mountains and buildings, while indoor sources of multipath include floors, walls, ceilings, and metal objects. Sources of multipath introduce error in RFID transponder detection by affecting power and phase measurements, thereby distorting information that may be extracted from the RF signals by interrogators.

Conventional understanding is that each of these techniques is incapable of producing accurate distance measurements, at least in the unlicensed ISM (industrial, scientific and medical) band of 902-928 MHz commonly used by UHF RFID, while compensating for the effects of practical multipath interference.

For example, TDOA requires operating RFID interrogators and transponders in short pulse mode. UHF RFID is a very short range narrowband technology, with a typical transponder read range on the order of 10-20 feet. However, because the roundtrip signal delay for a range of 10-20 feet is on the order of a few tens of nanoseconds and the bandwidth is narrow, RFID interrogators and transponders cannot operate in the short pulse mode required by TDOA.

As another example, distance measurements made using phase-based techniques according to conventional approaches, such as with TD-PDOA, SD-PDOA, and FD-PDOA, are prone to significant error in multipath environments. Multipath interference causes multiple rays of a transmitted RFID signal to constructively and destructively interfere with the signal strength and the phase of the transmitted RFID signal. Accordingly, RFID interrogators attempting to measure distance by employing phase-based techniques in an indoor multipath environment may result in distance measurements with an error in excess of 300%.

New approaches for operating interrogators in multipath environments are desirable.

BRIEF SUMMARY

In contrast to conventional approaches for determining distance between an interrogator and a transponder, frequency domain phase delay on arrival ("FD-PDOA") may be used in conjunction with error correction techniques to accurately determine transponder distance, speed, and bearing with respect to an interrogator. In contrast to conventional approaches for operating a transponder, which disregard derivatives of phase and signal strength of a response from an RFID transponder, the techniques taught herein compensate for range errors due to multipath by utilizing derivatives of phase and signal strength.

Described herein are approaches that allow determination of the distance between an interrogator and a transponder. Such may be useful on its own. Also described herein are approaches that allow determination of speed and/or bearing of a transponder relative to the interrogator or antenna(s) without a priori knowledge of the relative locations of multiple transponders.

An interrogation system to wirelessly interrogate wireless transponders may be summarized as including at least one antenna; a transmitter communicatively coupled to the at least one antenna and operable to transmit interrogation signals at each of a plurality of frequencies in a wireless communications frequency band; a receiver communicatively coupled to the at least one antenna to receive responses to the interrogation signals; and a controller communicatively coupled with the transmitter and the receiver and configured to: determine a first and a second derivative of signal strength of the received responses with respect to frequency over at least two of the frequencies, determine a first and a second derivative of phase of the received responses with respect to frequency over at least two of the frequencies, and determine at least one of a distance between the at least one antenna and a wireless transponder that responds to the interrogation signals, a bearing of the wireless transponder with respect to the at least one antenna or a speed based at least in part on the determined first and the determined second derivatives of signal strength of the received responses with respect to frequency and the determined first and the determined second derivatives of phase of the received responses with respect to frequency.

There may be only a single antenna and the transmitter and the receiver may be both communicatively coupled to the single antenna. The receiver may include a filter that filters out a direct current component of each of the received responses. The filtered direct current component may include a reader transmit-receive leakage. The controller may be configured to use an alternating current component from each response to determine an in-phase component and a quadrature component, and the first and the second derivative of phase may be based on a difference between the quadrature components of at least two responses divided by the in-phase components of the at least two responses. The controller may be further configured to determine a distance of at least the at least one antenna from at least one source of multipath. The controller may compensate for the at least one source of multipath by determining a difference between a direct distance from the at least one antenna to the transponder and an indirect distance from the at least one antenna to the transponder, the indirect distance including a distance from the at least one antenna to the at least one source of multipath and a distance from the at least one source of multipath to the transponder.

The controller may be configured to determine an error in the distance determination between the at least one antenna and the wireless transponder according to:

$$\ddot{\varphi} = -2A\Delta d^2 \frac{\sin k\Delta d}{(1 - 2A\cos k\Delta d + A^2)^2}(1 - A^2)$$

and $$\frac{\dot{P}}{P} = \frac{-2A\Delta d \sin k\Delta d}{1 - 2A\cos k\Delta d + A^2}$$

when a plot of signal strength verses frequency for responses is approximately linear, wherein P is signal strength, A is a relative magnitude of a reflected interrogation signal, and $k\Delta d$ is a phase term.

A plot of signal strength verses frequency for responses may be approximately linear when the phase term $k\Delta d$ is M*Pi/2, wherein M is an odd integer.

The controller may be configured to determine the distance between the at least one antenna and the wireless transponder according to:

$$\ddot{\varphi} \approx -2A\Delta d^2 \frac{(1 - A^2)}{(1 - A)^4} \text{ and } \frac{\dot{P}}{P} \approx \frac{-2A\Delta d}{(1 - A)^2}$$

when the phase term is Pi/2+2*Pi*M, wherein M is an integer, P is signal strength, and A is a relative magnitude of a reflected interrogation signal.

The interrogation system may further include a plurality of interrogators, wherein each of the plurality of interrogators is configured to communicate with each other interrogator of the plurality of interrogators and the plurality of interrogators is configured to determine the bearing or the speed of the transponder.

Communication between interrogators may include a first interrogator of the plurality of interrogators responding to a query made by a second interrogator of the plurality of interrogators as if the first interrogator were a second transponder.

The interrogation system may include a single interrogator, wherein the at least one antenna is a plurality of antennas.

A method of operating an interrogation system may be summarized as including transmitting interrogation signals from at least one antenna at each of a plurality of frequencies in a wireless communications frequency band; receiving responses to the interrogation signals at the at least one antenna; determining a first and a second derivative of signal strength of the received responses with respect to frequency over at least two of the frequencies by a control subsystem; determining a first and a second derivative of phase of the received responses with respect to frequency over at least two of the frequencies by the control subsystem; and determining by the control subsystem at least one of a distance between the at least one antenna and a wireless transponder that responds to the interrogation signals, a bearing of the wireless transponder with respect to the at least one antenna or a speed based at least in part on the determined first and the determined second derivatives of signal strength of the received responses with respect to frequency and the determined first and the determined second derivatives of phase of the received responses with respect to frequency The method of operating an interrogation system may further include filtering a direct current component from each of the received response and determining an in-phase component and a quadrature component of an alternating current component of each received response, wherein determining the first and second derivatives of phase includes based at least in part on the in-phase component and the quadrature component.

The method of operating an interrogation system may further include determining by the control subsystem whether a maximum signal strength and a minimum signal strength is measurable within the plurality of frequencies and determining a relative magnitude of a reflected interrogation signal reflected by a source of multipath interference if the maximum and the minimum is measurable.

Determining the first and the second derivative of phase of the received responses with respect to frequency may include determining a difference between a direct distance from the antenna to the transponder and an indirect distance from the antenna to the transponder via a source of multipath interference.

Determining the difference between the direct distance and the indirect distance may be performed according to:

$$\ddot{\varphi} = -2A\Delta d^2 \frac{\sin k\Delta d}{(1 - 2A\cos k\Delta d + A^2)^2}(1 - A^2)$$

and $$\frac{\dot{P}}{P} = \frac{-2A\Delta d \sin k\Delta d}{1 - 2A\cos k\Delta d + A^2}$$

when a plot of signal strength verses frequency for responses is approximately linear, wherein P is signal strength, A is a relative magnitude of a reflected interrogation signal reflected by the source of multipath interference, and $k\Delta d$ is a phase term.

Determining the difference between the direct distance and the indirect distance may be performed according to:

$$\ddot{\varphi} \approx -2A\Delta d^2 \frac{(1-A^2)}{(1-A)^4} \text{ and } \frac{\dot{P}}{P} \approx \frac{-2A\Delta d}{(1-A)^2}$$

when a phase term is Pi/2+2*Pi*M, wherein M is an integer, P is signal strength, and A is a relative magnitude of a reflected interrogation signal.

The method of operating an interrogation system may further include determining by the control subsystem at least one of the frequencies where a phase term kΔd is one of 0+2*Pi*M, Pi/2+2*Pi*M, Pi+2*Pi*M, or 3*Pi/2+2*Pi*M, wherein M is an integer, k=2*Pi/c, and Δd is difference between the distance between the at least one antenna and the wireless transponder and an indirect distance between the at least one antenna and the wireless transponder which includes a source of multipath interference.

The method of operating an interrogation system may further include determining by the control subsystem at least two of the following at the at least one of the frequencies where the phase term is one of 0+2*Pi*M, Pi/2+2*Pi*M, Pi+2*Pi*M, or 3*Pi/2+2*Pi*M: the second derivative of phase, a third derivative of phase, a first derivative of signal strength divided by signal strength, and a second derivative of signal strength divided by a first derivative of signal strength.

BRIEF DESCRIPTION OF THE SEVERAL VIEWS OF THE DRAWINGS

Non-limiting and non-exhaustive embodiments are described with reference to the following drawings, wherein like reference numerals refer to like parts throughout the various views unless otherwise specified. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations associated with transponders, for example RFID transponders or tags, and interrogators or readers, for example RFID readers, computer and/or telecommunications networks, and/or computing systems are not shown or described in detail to avoid obscuring aspects of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Reference throughout this specification and claims to "radio frequency" or RF includes wireless transmission of electromagnetic energy, including, but not limited to, energy with frequencies or wavelengths typically classed as falling in the radio and microwave portions of the electromagnetic spectrum.

The headings provided herein are for convenience only and do not interpret the scope or meaning of the embodiments.

Figure 1:
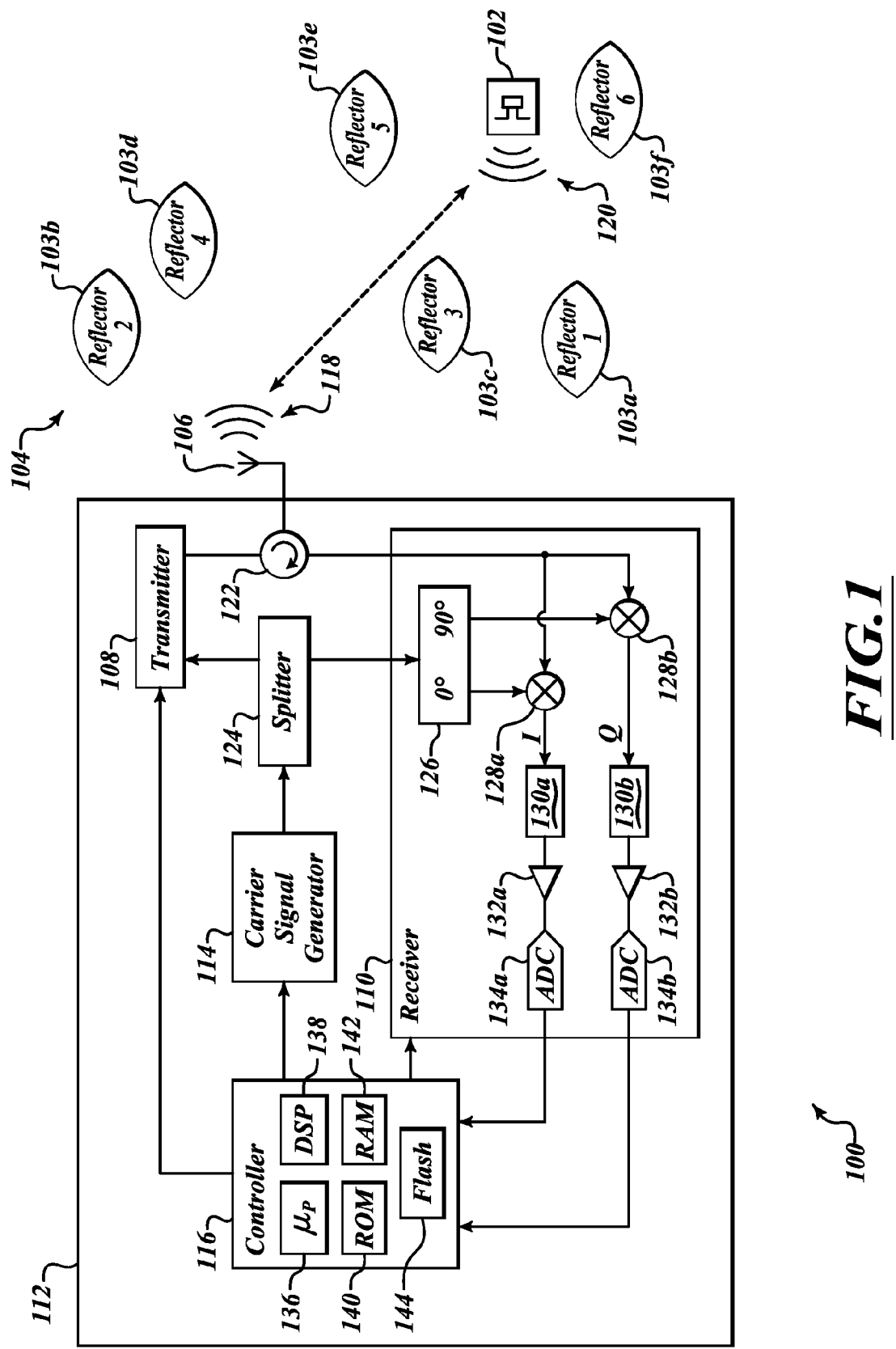
FIG. 1 is a schematic diagram of an interrogator or reader interrogating a transponder in a field including multipath interference sources, according to one illustrated embodiment.

FIG. 1 shows an interrogator or reader 100 and a transponder 102 located within a range or field 104 of the interrogator or reader 100, according to one illustrated embodiment.

The range or field 104 includes one or more sources of multipath inference, denominated herein as reflectors 103a-103f (collectively 103). While only one transponder 102 is illustrated, in typical applications there may be many more transponders 102 in the field 104. Similarly, while six reflectors 103 are illustrated, the field 104 may contain any number of reflectors 103, even no reflectors. The number and/or location or positions of the reflectors 103 may not be known a priori. The interrogator or reader 100 is operable to wirelessly transmit a signal to the transponder 102, but does not have an a priori knowledge of the distance or location of transponder 102 in the field 104.

For simplicity of explanation hereinafter, the interrogator or reader 100 will be described in the context of being an RFID reader that is dedicated to wirelessly reading RFID transponders. The terms reader and interrogator are used interchangeably herein and in the claims to refer to a device or system that is capable of transmitting an interrogation signal into a field 103, and receiving a response signal from one or more transponders 102 in the field. Typically, the reader or interrogator 100 will receive a response signal encoding some information, for example a unique identifier. Some readers or interrogators are capable of receiving other information from transponders, and/or writing information to transponders. Likewise, the terms range and field are used interchangeably herein and in the claims. The terms interrogation and inquiry are used interchangeably herein and in the claims to refer to a wireless signal transmitted or sent by an interrogator or reader. Similarly, the terms response or return are used interchangeably herein and in the claims to refer to a wireless signal transmitted or sent by a transponder or tag, for instance backscattered thereby. The terms radio frequency or RF are used herein and in the claims in their conventional sense, that is as encompassing that portion of the electromagnetic spectrum typically delineated as radio and microwave portions. Further, the terms signal and signals encompass transmissions which may, or may not, include or encode data or information and/or instructions or commands. For instance, a signal includes a transmission that does not encode data or instructions, but which simply provides power to a passive transponder. Also for instance, a signal includes transmissions that have collided such that information encoded therein has become distorted or can no longer be recovered. Only significant components of the reader 100 are illustrated, and less relevant components are not shown or described in detail in the interest of clarity of presentation.

While described in terms of RFID applications, the reader 100 and transponders 102 can take various other forms. For example, the reader or interrogator 100 may only determine range and/or bearing of a transponder 102, without receiving an additionally information. Additionally, the reader 100 may be mobile, may be hand held, or may be a stationary (non-portable) or semi-stationary device (such as attached to a forklift). Even further, the reader 100 can be a multi-mode device having the capability to read other types of data carriers (e.g., machine-readable symbols, touch memories, optical memories, magnetic stripes, etc.) in addition to reading wireless transponders.

The reader 100 includes at least one antenna 106, a transmitter 108, a receiver 110, a housing 112, a carrier signal generator 114 and a controller 116. The reader 100 wirelessly sends or transmits one or more RF interrogation or inquiry signals 118 to one or more of the transponders 102, and wirelessly receives one or more RF response or return signals 120 (only one called out in FIG. 1) sent by the RFID transponder(s) 102.

The inquiry signals 118 and the return signals 120 may pass between the reader 100 and the transponder 102 via multiple paths. Any reflectors 103 in the field 104 and may cause reflections of the inquiry signals 118 and reflections of the return signals 120 to be received in conjunction with the original signals at the reader 100 and the transponder 102. The reflectors 103 may be indoor sources of multipath interference such as may be commonly found within a warehouse, e.g., a floor, walls, a ceiling, a fork-lift or other large mechanical equipment, machinery, vehicles, containers, or the like.

While multiple reflectors 103 may exist in the field 104, the reflector 103c closest to the direct path between the reader 100 and the transponder 102 will typically be the largest source of multipath interference, substantially greater than the interference produced by the other reflectors 103a, 103b, 103d, 103e, and 103f. This effect can be attributed to path loss in propagation channels. Path loss between two communicating antennas may depend strongly on the propagation environment. Path loss in free space is usually proportional to $d^{-2}$, where d is the length of the ray path. However, at long distances, e.g., distances including a reflection path, path loss is proportional to $d^{-4}$. Consequently, the non-closest reflectors 103a, 103b, 103d, 103e, and 103f diminish exponentially by $d^{-4}$ so that the non-closest reflectors 103a, 103b, 103d, 103e, and 103f may have a negligible effect in comparison to the closest reflector 103c.

As illustrated, the reader 100 may include a single antenna 106 to both transmit the interrogation signals 118 and to receive the return signals 120. The reader 100 may include a circulator 122 or similar element to communicatively couple the single antenna 106 to the transmitter 108 and receiver 110. Alternatively, the reader 100 may include one or more antennas for transmission and one or more separate antennas for reception. The antenna(s) 106 may be external or internal to the housing 112. For the sake of simplicity of explanation, the reader 100 will be described having the single antenna 106 used for both transmission and reception.

The transmitter 108 and the receiver 110 may each receive a signal generated by one or more carrier signal generators 114, for example via a splitter 124. The carrier signal generator 114 may take a variety of forms. For example, the carrier signal generator 114 may take the form of a voltage controlled oscillator or local oscillator (LO) or similar circuit or structure that generates a signal with a frequency of, or approximate to, a frequency of the carrier wave. The carrier signal generator 114 may generate signals at frequencies suitable for the particular transponders 102 and/or at a variety of frequencies to accommodate various different types of transponders. The splitter 124 or similar circuit or structure splits the signal from the carrier signal generator between the transmitter 108 and receiver 110. Alternatively, the transmitter 108 and receiver 110 may receive signals from respective carrier signal generators or local oscillators, for example where the response signals 120 are on a carrier having a substantially different frequency than the carrier of the interrogation signals 118. As illustrated, the controller 116 may be communicatively coupled to control the carrier signal generator 114.

The transmitter 108 can take any of a variety of forms suitable to wirelessly transmit interrogation signals or inquiries to the transponders 102. The transmitter 108 may transmit at frequencies suitable for the particular transponders 102 and/or at a variety of frequencies to accommodate various transponders. Likewise, the transmitter 108 may employ any variety of protocols, for example Class 0 or Class 1 Generation 1 protocols, or Class 1 Generation 2 protocol (ISO 18000-6C). The controller 116 may be communicatively coupled to control the operation of the transmitter 108, and/or provide information or data to the transmitter 108 to be encoded into the interrogation signals 118.

The receiver 110 can take a variety of forms suitable to receive wireless response signals from transponders 102. The receiver 110 may be responsive to frequencies suitable for the particular transponders 102 and/or responsive to a variety of frequencies to accommodate various transponders. Likewise, the receiver 110 may be capable of handling any variety of protocols.

In particular, the receiver 110 demodulates the received signal into in-phase and quadrature components. For example, one or more phase shifters 126 (only one illustrated) may receive the signal generated by the carrier signal generator 114, for example via the splitter 124. The phase shifter 126 supplies an in-phase LO signal (i.e., I channel) to a first mixer 128a, and a quadrature LO signal (i.e., Q channel) to a second mixer 128b. The phase shifter 126 may take a variety of forms, for example a parallel combination of two varactors each respectively coupled in series with an inductor. The mixers 128a, 128b can take any of a variety of forms suitable for down conversion of the received RF response signal using a local oscillator (LO) signal. Respective filters 130a, 130b filter the in-phase I and quadrature Q analog baseband outputs of the mixers 128a, 128b. The filters 130a, 130b may remove DC components of the demodulated signal, including reader transmit-receive leakage, static environment clutter, and backscatter from the tag (which contains both static and modulated components). Respective amplifiers 132a, 132b may baseband amplify the filtered in-phase I and quadrature Q signals. Respective analog-to-digital (ADC) converters or slicers 134a, 134b may sample, digitize or otherwise convert the in-phase I and quadrature Q analog baseband outputs of the mixers 128a, 128b into a complex-valued digital representation suitable for processing in the digital domain of the controller 116. While not illustrated, the receiver 118 may also include a comparator and other components for determining which of the in-phase I or quadrature Q components of the received response signal is stronger, and coupling that information to the controller 116.

The controller 116 may take a variety of forms and may include one or more processors, for example one or more microprocessors 136, digital signal processors (DSPs) 138, application specific integrated circuits (ASICs) or programmable gate arrays (PGAs). The controller 116 may also include computer- or processor-readable storage media, for instance read only memory (ROM) 140, random access memory (RAM) 142, flash memory 144, and/or other type of memory. The microprocessors 136, DSPs 138, ASICs, PGAs, ROM 140, RAM 142, and/or Flash memory 144 may be communicatively coupled by one or more buses (not illustrated), for instance one or more power busses, instruction busses, or data busses. The ROM 140, RAM 142, and/or Flash memory 144 may store instructions such as a computer program in the form of software or firmware. The instructions are executable by the microprocessors 136 and/or DSPs 138 to perform the various operations described herein pertaining to determining distance between the reader 100 and the transponder 102.

The controller 116 processes the digitized return signals 120 received by the reader 100, as well as to control the operation of various other components (e.g., transmitter) of the reader 100 in response. As explained below, the controller 116 may control the transmission of interrogation signals 118 to determine derivatives of phases and signal strengths of the received response signals 120 to determine the distance, speed, and/or bearing of the transponder 102 in the field 104.

While not illustrated, the reader 100 may include a user interface which may include one or more user selectable or operable controls. For example, the reader may include one or more displays (e.g., liquid crystal display (LCD)) upon which elements of a graphical or command line user interface may be presented by the microprocessor 136. Also for example, the user interface may include one or more actuators, for instance one or more triggers, buttons, switches, keys, joystick, thumbstick, trackpad, touch screen, microphone, via which a user may enter instructions, commands, data or information. Also for example, the user interface may include one or more indicators, for instance one or more optical indicators (e.g., light emitting diodes (LEDs, OLEDs)), speakers, and/or mechanical or tactile vibrators.

Also while not illustrated, the reader 100 may include other components 122 to support operation thereof. Such components can include, for example, communication components (e.g., wired port or connector for instance USB ports, radio, cellular, WIFI and/or BLUETOOTH® chipsets) to enable the reader 100 to communicate with an external network/system (such as to download/upload data, information, instructions, commands and/or software or firmware updates). Such components can include, for example, a decryption chipset to decrypt encrypted information decoded from the received return signals 120. Such components can further include, for example, scanning and/or imaging components, for example if the reader 102 is a multi-mode automatic data collection device (e.g., RFID and machine-readable symbol reader).

Also, while not illustrated the reader 100 may include one or more power supplies and/or power sources. Power sources may, for instance, include one or more batteries (e.g., primary or secondary), super- or ultra-capacitor arrays, and/or fuel cells. Power supplies may, for instance, include one or more rectifiers, inverters, DC/DC converters, and/or transformers. Power supplies may also, for instance, include a trickle charger circuit coupled to recharge a secondary battery from an external power source, such as from common AC power (e.g., 120V 60 Hz) via an AC power plug.

Figure 2:
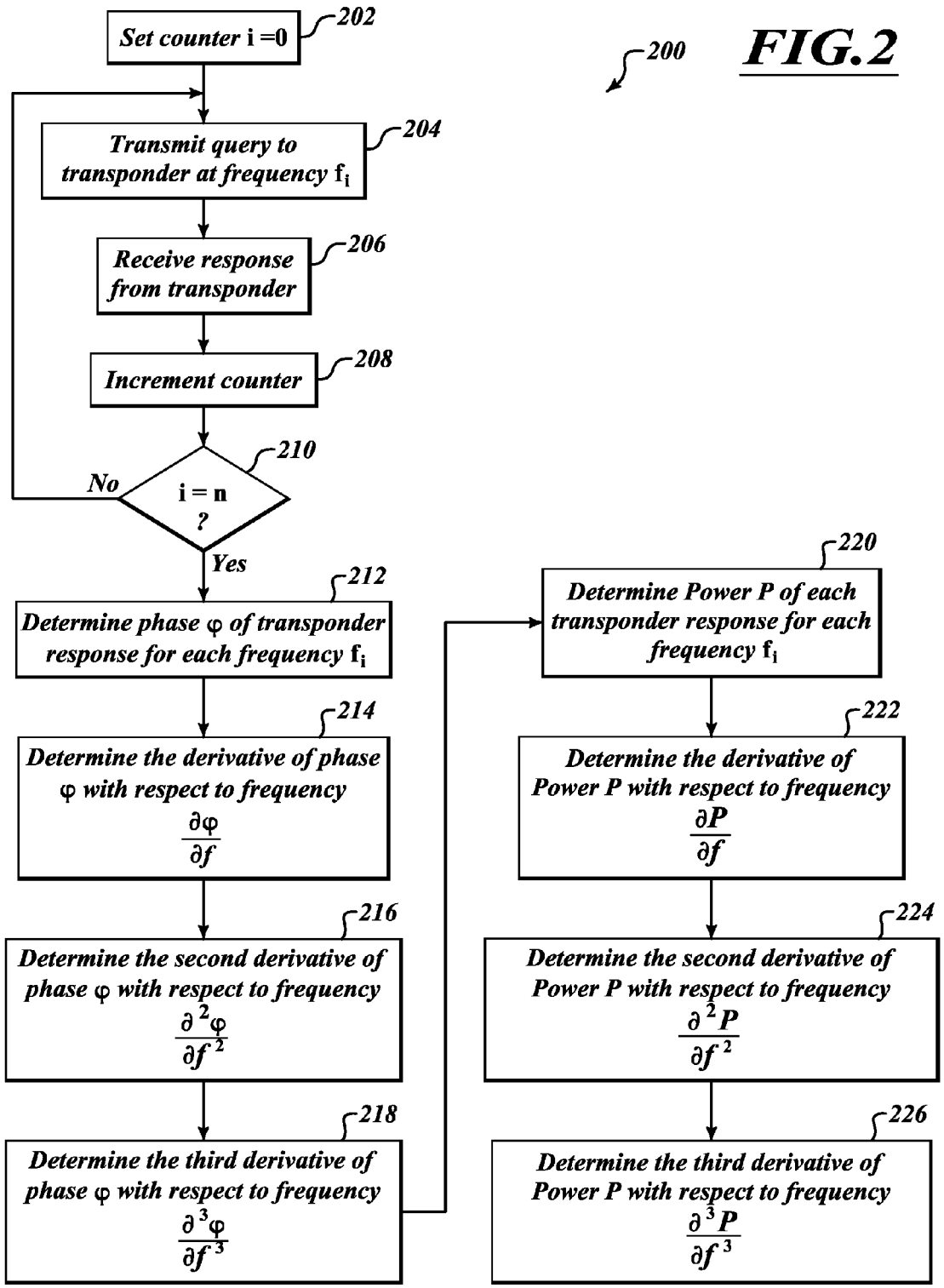
FIG. 2 is a low level flow diagram of a method of operating an interrogator or reader similar to that of FIG. 1, according to one illustrated embodiment.

FIG. 2 shows a method 200 of operating a reader, for example the reader 100, in the multipath environment illustrated in FIG. 1, according to one illustrated embodiment. The method 200 of operating the reader may perform frequency domain phase difference of arrival ("FD-PDOA") estimation.

As an overview of the method 200, the reader transmits an interrogation or inquiry signal at a frequency and receives a response from a transponder. The reader repeats this procedure, varying the frequency until the transponder is queried at a plurality of frequencies and a corresponding plurality of responses is received. The reader then determines the phase of each response as well as first, second, and third derivatives of the phase. The reader also determines the signal strength and power of each response as well as first, second, and third derivatives of the power.

At 202, the reader sets a counter i that the reader may use to iteratively query a transponder at a plurality of frequencies. In particular, the controller may set the counter i to 0 to begin counting through a sequence of frequencies.

At 204, the reader transmits a query with an array of baseband frequencies $f_i$. The array of baseband frequencies $f_i$ for the query is accessed as the counter i changes. The array of baseband frequencies $f_i$ may be a range of frequencies spanning a particular portion of the RF spectrum. In particular, the range of frequencies may span the unlicensed ISM (industrial, scientific and medical) band of 902-928 MHz used by UHF RFID.

Each frequency element in the array may be set manually, for example, by a user. Alternatively, each frequency or element in the array may be determined by establishing a range of frequencies over which queries will be transmitted and by setting the size of the array. Each increase in frequency in the array may be uniform throughout the array. Alternatively, some increases in frequency between array elements may vary in accordance with a function, in accordance with a user-entered preference, or randomly.

At 206, the reader receives a response to the query from a transponder in the field. The response from a passive transponder may be modulated, so as to distinguish the response from that of a mere reflection. A transponder may modulate its response or backscattered signal by switching its input impedance between two states (e.g., a high impedance state and a low impedance state). At each impedance state, the transponder projects a specific power. A difference in power levels between each impedance state may be used to determine a phase of the response.

At 208, the counter i may be incremented in order to access a subsequent frequency in the array of baseband frequencies $f_i$. The counter i and query transmissions may be managed by the transmitter. Alternatively, the controller or carrier signal generator may manage counter i and query transmissions.

At 210, the reader may compare the counter i with a number of queries n. If the counter i is not equal to the number of queries n, the reader may have another query transmitted. If the counter i is equal to the number of queries n, control may pass to 212.

Before the signal strength and phase of the responses are determined, the reader demodulates the received responses. In particular, the receiver may down convert the received responses into alternating current ("AC") in-phase and quadrature components. This may include employing phase shifters, mixers, and filters. For example, some of the direct current ("DC") parts of the response that may be removed include the reader transmit-receive leakage. Isolation between transmit and receive channels facilitates proper detection and decoding of transponder responses. Other DC parts of the response that may be filtered out include static environment clutter and backscatter from the transponder or tag. The remaining AC in-phase and quadrature components of the responses may be utilized to determine the signal strength and phase of the received responses.

At 212, the reader determines the phase $\phi$ of each transponder response according to the queries transmitted at each frequency in the baseband frequency array $f_i$. The reader may determine the phase $\phi$ based on the AC in-phase and component $I_{ac}$ and the AC quadrature component $Q_{ac}$ of each response. This may more easily be understood in view of a phasor diagram and IQ plot.

Figure 3:
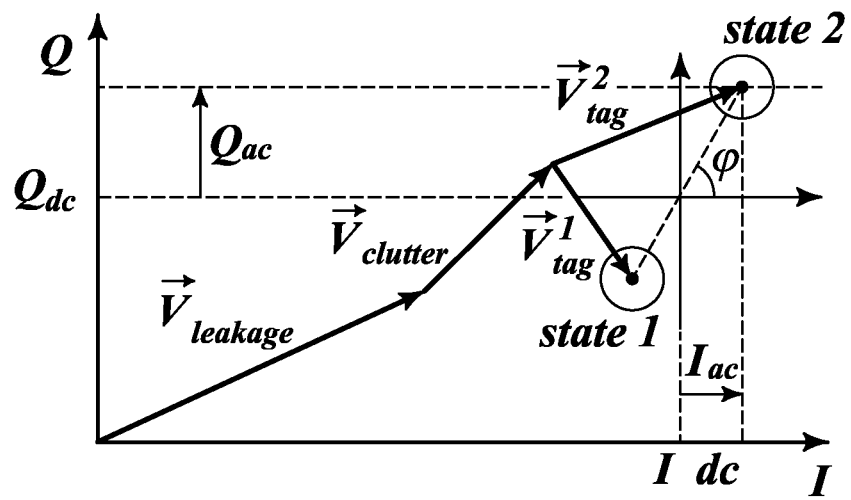
FIG. 3 is an in-phase verses quadrature phasor diagram of voltage responses from a query of a transponder, according to an embodiment.

FIG. 3 is a phasor diagram illustrating state 1 and state 2 of a modulated backscatter response received at the reader from of a transponder, according to one illustrated embodiment.

The complex demodulated voltage at the reader can be written as the sum of three components:

$$\vec{V} = \vec{V}_{leakage} + \vec{V}_{clutter} + \vec{V}_{tag},$$

where $\vec{V}_{leakage}$ is the voltage due to the reader transmit-receive leakage (including reflection from the mismatched reader antenna), $\vec{V}_{clutter}$ is the voltage due to the scatter from the static environment clutter, and $\vec{V}_{tag}$ is the voltage due to the backscatter from the tag when the tag is in either state 1 or state 2.

Figure 4:
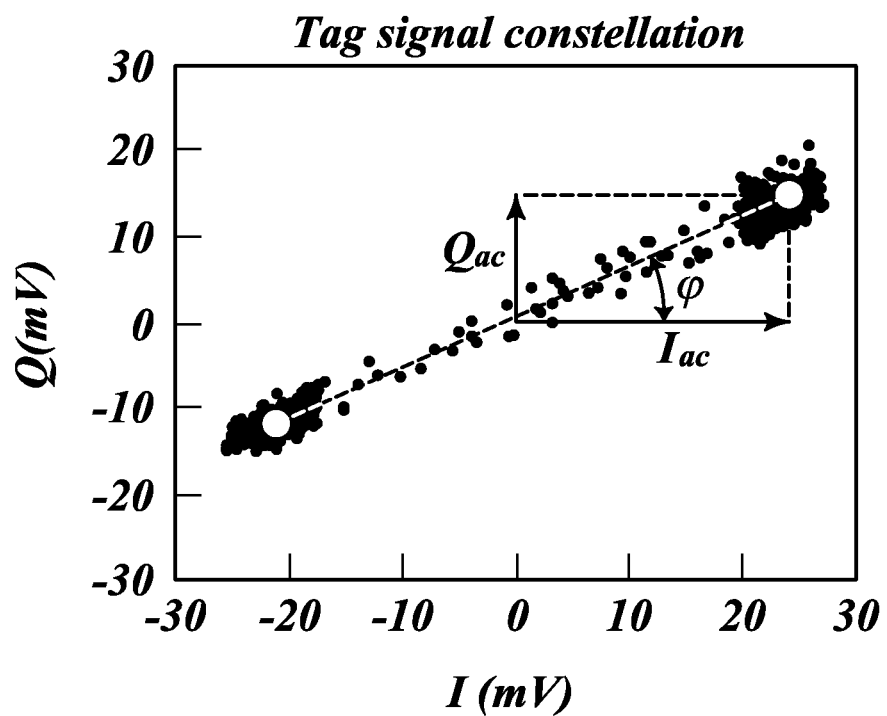
FIG. 4 is a graph of in-phase versus quadrature voltages of responses received from multiple queries of a transponder.

FIG. 4 shows the AC in-phase component $I_{ac}$ and quadrature component $Q_{ac}$ of FIG. 3 after the DC part of the signals has been filtered out.

After removal of the DC part of the signals, the constellation of the transponder responses to queries of a single baseband frequency is centered at zero and may be dumbbell-shaped.

The received phase $\phi$ may be determined by converting the in-phase component $I_{ac}$ and the quadrature component $Q_{ac}$ from rectangular coordinates to polar coordinates. Thus, the phase $\phi$ is:

$$\varphi = ang(\vec{V} \text{ tag state } 2 - \vec{V} \text{ tag state } 1) = \arctan\left(\frac{Q_{ac}}{I_{ac}}\right).$$

Because the phase $\phi$ of a response may be measured, characterization of and compensation for multipath interference may be accomplished using expressions or formulae which take advantage of a known value of the phase $\phi$. For example, in a 2-ray environment, i.e., a direct ray and an indirect ray, the field incident on a transponder contains the following term:

$$S = 1 - Ae^{-jk\Delta d} = 1 - A\cos(k\Delta d) + jA\sin(k\Delta d),$$

where $0 < A < 1$ is the relative magnitude of a reflected ray, $\Delta d$ is the difference in paths between the direct and reflected rays, and k is the wave vector proportional to frequency and is expressed as:

$$k = \frac{2\pi f}{c},$$

c being the speed of light. The phase $\phi$, may then be expressed as:

$$\varphi = F - 2kG - 2kd + 2\arctan\left(\frac{A\sin(k\Delta d)}{1 - A\cos(k\Delta d)}\right),$$

where F includes various constant phase offsets and G includes transmission line length in the reader, connecting cables, and antenna assembly.

Expressing the phase $\phi$ in the manner above exposes variables that, when solved, provide the distance d between the reader and the transponder while compensating for influence of multipath interference. Additionally, the above expression provides information about a source of multipath interference that may be unknown a priori. In particular, A indicates the relative magnitude of the reflected ray and $\Delta d$ indicates how much farther the reflected ray traveled to the transponder via the source of multipath interference. Accordingly, solving for the unknown variables d, A and $\Delta d$ may determine the distance of the transponder relative to the reader and facilitate characterizing and compensating for the source of multipath interference.

The reader may determine the signal strength and the phase of the received responses as they are received rather than after an array of queries has been transmitted. In particular, a controller may be operable to cause the receiver or a processor to determine phase and signal strength of the received responses as the responses are received.

At 214, the reader determines the derivative with respect to frequency of the phase $\phi$ of the received responses. The derivative of the phase $\phi$ may be expressed as:

$$\frac{\partial \varphi}{\partial f} = -2G - 2d + \frac{\partial \varphi}{\partial f} error_\varphi,$$

and $$\frac{\partial \varphi}{\partial f} error = -2A\Delta d \frac{A - \cos k\Delta d}{1 - 2A\cos k\Delta d + A^2}.$$

This expressions of the derivative of the phase $\phi$ may be used with the expression for the phase $\phi$ to determine the distance d to the transponder from the reader, A, and $\Delta d$.

In narrowband interrogation, the phase error introduced above may be determinative in whether or not a ranging technique such as FD-PDOA estimation can produce viable results. The additive nature of phase presents challenges when attempts are made to distinguish the influence of indirect rays from direct rays of queries. In many practical cases, significant variation of the phase term $k\Delta d$ may be observed in the 902-928 MHz band. For example, difference in paths ($\Delta d$) of 10 feet results in transponder phase changing over that band by 95 degrees. The influence of multipath interference on phase may result in errors in distance measurements exceeding 300%. That is, a transponder that is only 1.4 meters away may be read as being more than 5.6 meters away. This is a significant amount of error when the typical transponder range from the reader is 1.5-6.1 meters (5-20 feet).

The reader may determine the value of the derivative based on the responses received by the receiver from the transponder using various techniques. For example, the reader may determine the difference between phase φ measurements and divide by the difference between the corresponding baseband frequencies of the queries from which the phase φ measurements originated. Alternatively, the reader may use complicated algorithms to determine the derivative.

At 216, the reader may determine the second derivative with respect to frequency of the phase φ. The value of the second derivative may be determined based on measured values of the phase φ at various frequencies. As a result, the quality of the second derivative may depend upon the number of samples acquired, i.e., the number of queries transmitted. The expression of the second derivative of the phase φ in terms of A and Δd may be combined with the expressions for the phase φ and the derivative of the phase φ to determine the distance d to the transponder and to determine the phase error injected into the signal by the source of multipath interference.

At least two expressions may be used to represent the second derivative of the phase φ. As will be described in more detail in connection steps 220-226, a power P verses frequency curve may result in easily attainable solutions of A. When the power P verses frequency curve looks linear, i.e., kΔd is either π/2, or 3π/2, etc., an expression for the second derivative of the phase φ is:

$$\frac{\partial^2 \varphi}{\partial f^2} = -2A\Delta d^2 \frac{\sin k\Delta d}{(1 - 2A\cos k\Delta d + A^2)^2}(1 - A^2).$$

A second expression for the second derivative of the phase φ occurs when the phase term kΔd is off by π from the first expression for the second derivative. In particular, when the phase term kΔd is π/2+2π*M, where M is an integer, the second derivative of the phase φ can be reduced to:

$$\frac{\partial^2 \varphi}{\partial f^2} = -2A\Delta d^2 \frac{(1 - A^2)}{(1 - A)^4}.$$

Thus, the three expressions of phase including the phase φ, the derivative of the phase φ, and the second derivative of the phase φ are three equations that may be used to solve for the three unknowns, i.e., d, A, and Δd.

At 218, the reader may determine the third derivative of the phase φ. In a manner similar to the preceding, the value of the third derivative may be obtained by exercising any one of a variety of techniques using the measurements of phase with respect to frequency. Additionally, the third derivative may also be expressed in terms of Δd and A for at least the two cases described in connection with determining the second derivative with respect to frequency of the phase φ 216. Taking the third derivative with respect to frequency of the phase φ may provide an additional equation by which the unknown variables d, A, and Δd may be solved. The reader may solve multiple equations with multiple unknowns using various techniques, including the linear algebraic technique of simultaneously solving the equations.

At 220, the reader determines a power P of each transponder response for each frequency in the baseband frequency array $f_i$. The power P is proportional to the square root of the signal strength RSSI. The reader may determine the signal strength RSSI based on the AC in-phase component $I_{ac}$ and the AC quadrature component $Q_{ac}$ of each response.

Referring again to FIG. 3, the received signal strength RSSI may be determined as approximately the square of the difference between state 1 and state 2 of the transponder backscatter:

$$RSSI = \frac{1}{2} \frac{|\vec{V} \text{ tag state 2} - \vec{V} \text{ tag state 1}|^2}{Z_o} = \frac{I_{ac}^2 + Q_{ac}^2}{Z_o},$$

where $Z_o$ is the input impedance of the reader, e.g. 50Ω. As a result, characterizations of multipath interference may be facilitated using expressions or formulae which take advantage of a known or measured value of RSSI and the power P. With reference to the term within the field incident on a transponder, $$S = 1 - Ae^{-jk\Delta d} = 1 - A\cos(k\Delta d) + jA\sin(k\Delta d),$$

the signal strength RSSI, which is proportional to $|S|^4$, and power P, which is proportional to $|S|^2$, may then be expressed as:

$$P = \sqrt{RSSI} = E(1 - 2A\cos(k\Delta d) + A^2),$$

where E is a constant including reader receiver channel gains and free space path loss. This expression of the power P may be combined with expressions of the phase φ to determine the unknown variables A and Δd.

In some instances, the unknown variable A may be determined based solely minimums and maximums of the power P. As can be seen from the above expression for power, a minimum of the power P exists when the phase term kΔd is 0, 2π, or multiples thereof. A maximum of the power P exists when the phase term kΔd is π, 3π, or other odd multiples of π. When the phase term kΔd is π/2, 3π/2, or other odd multiples of π/2, the power P is at a mid-point.

The unknown variable A, i.e., the relative magnitude of a reflected ray, may be determined based on expressions of a maximum $P_{max}$ of the power P and a minimum $P_{min}$ of the power P. A ratio of $P_{max}$ to $P_{min}$ may be expressed by:

$$\frac{P_{max}}{P_{min}} = \frac{(1 + A)^2}{(1 - A)^2}.$$

Accordingly, solving for the relative magnitude A, results in:

$$A = \frac{\sqrt{\frac{P_{max}}{P_{min}}} - 1}{\sqrt{\frac{P_{max}}{P_{min}}} + 1}.$$

If minima and maxima of the power P are not determinable within the band of frequencies, e.g., 902-928 MHz, the reader may construct an $N^{th}$ order polynomial approximation to the power P with respect to frequency. The reader may determine parabolic coefficients using an N number of frequencies to then estimate $P_{max}$, $P_{min}$, and the frequency at which the phase term kΔd is either π/2 or 3π/2.

At 222, the reader determines the derivative with respect to frequency of the power P. The reader may execute any number of suitable algorithms to determine the derivative with respect to frequency of the power P of responses received from a transponder by the reader. When the power P verses frequency curve looks linear, i.e., kΔd is either π/2, or 3π/2, etc., an expression for the derivative of the power P may be:

$$\frac{\partial P}{\partial f} = -2A\Delta d \sin(k\Delta d).$$

Thus, the ratio of the derivative of the power P to the power P may be expressed as:

$$\frac{\dot{P}}{P} = \frac{-2A\Delta d \sin(k\Delta d)}{1 - 2A\cos(k\Delta d) + A^2}.$$

A second expression for the derivative of the power P occurs when the phase term kΔd is off by π from the first expression for the derivative. In particular, when the phase term kΔd is π/2+2π*M, where M is an integer, the derivative of the power P can be reduced to:

$$\frac{\partial P}{\partial f} = -2A\Delta d.$$

Thus, the ratio of the derivative of the power P to the power P may be expressed as:

$$\frac{\dot{P}}{P} = \frac{-2A\Delta d}{(1-A)^2}.$$

As discussed previously in connection with the various expressions for the phase φ, the reader or interrogator may combine these expressions of the power P with the known or measured values of the power P to facilitate the determination of the distance d, relative magnitude A, and difference in paths Δd.

Figure 5:
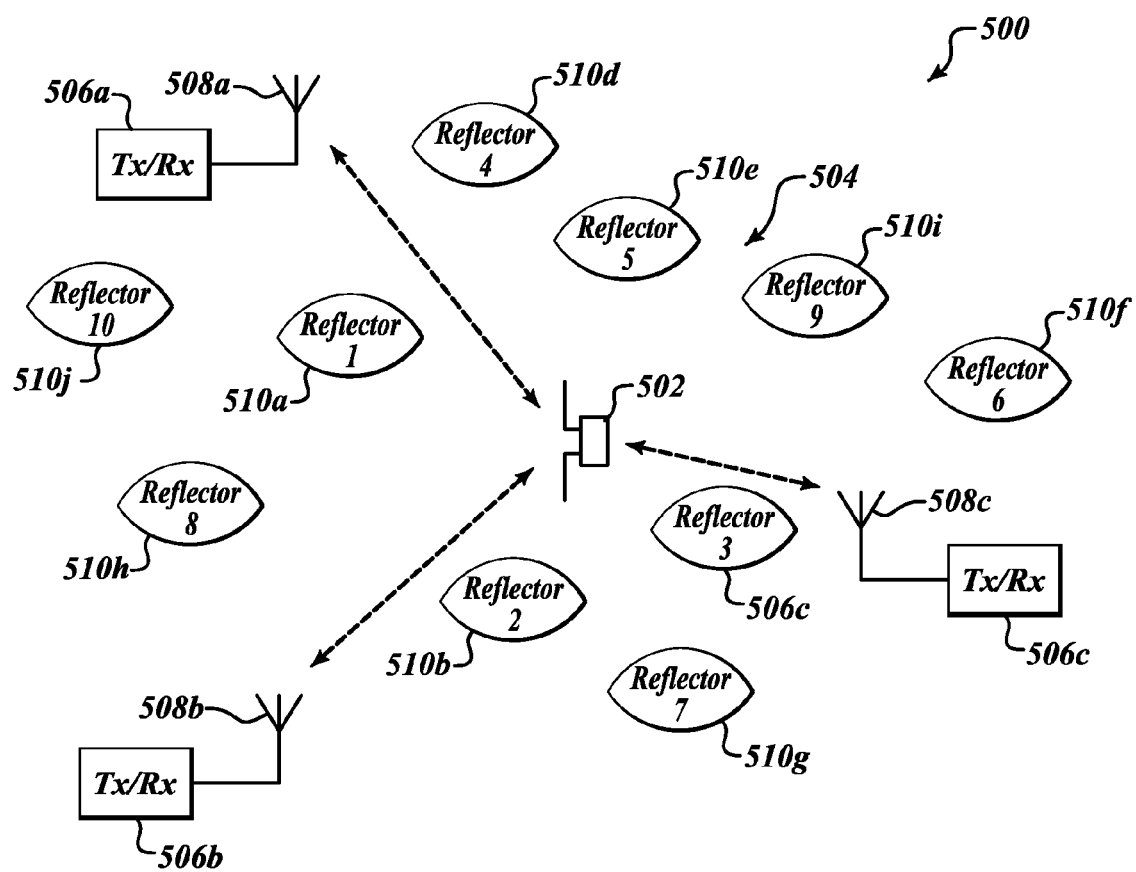
FIG. 5 is a schematic diagram of a plurality of interrogators or readers interrogating a transponder.

FIG. 5 shows an interrogation system 500 including a plurality of interrogators or readers 506a-506c (collectively 506), and at least one transponder 502 located within a range or field 504 of the interrogators or readers 506, according to one illustrated embodiment.

The field 504 may include a number of reflectors 510a-510j (collectively 510). The reflectors represent various potential sources of multipath interference. The field 104 may contain any number of reflectors 103, even no reflectors. While only three readers 506 are illustrated, an application may employ any number of readers 506. The readers 506 may be individually coupled to antennas 508a-508c (collectively 508) to transmit queries to the transponder 502 and receive responses from the transponder 502. The interrogator or readers 506 are operable to wirelessly transmit a signal to the transponder 102, but does not have an a priori knowledge of the distance or location of transponder 102 in the field 104.

Because path loss at long distances is proportional to $d^{-4}$, where d is the length of the ray's path, the readers 506 may neglect reflectors 510 that are not located closest to direct paths between readers 506 and the transponder 502.

The interrogation system 500 may employ the techniques previously described in connection with method 200 to determine a distance between each of the readers 506 and the transponder 502. The readers 506 may have a priori data indicating relative locations of the readers 506 with respect to one another, or relative to some common or generalized coordinate system. Accordingly, the readers 506 may determine a three-dimensional location of the transponder 502 based on an intersection of the distances between each of the readers 506, e.g., via triangulation.

Figure 6:
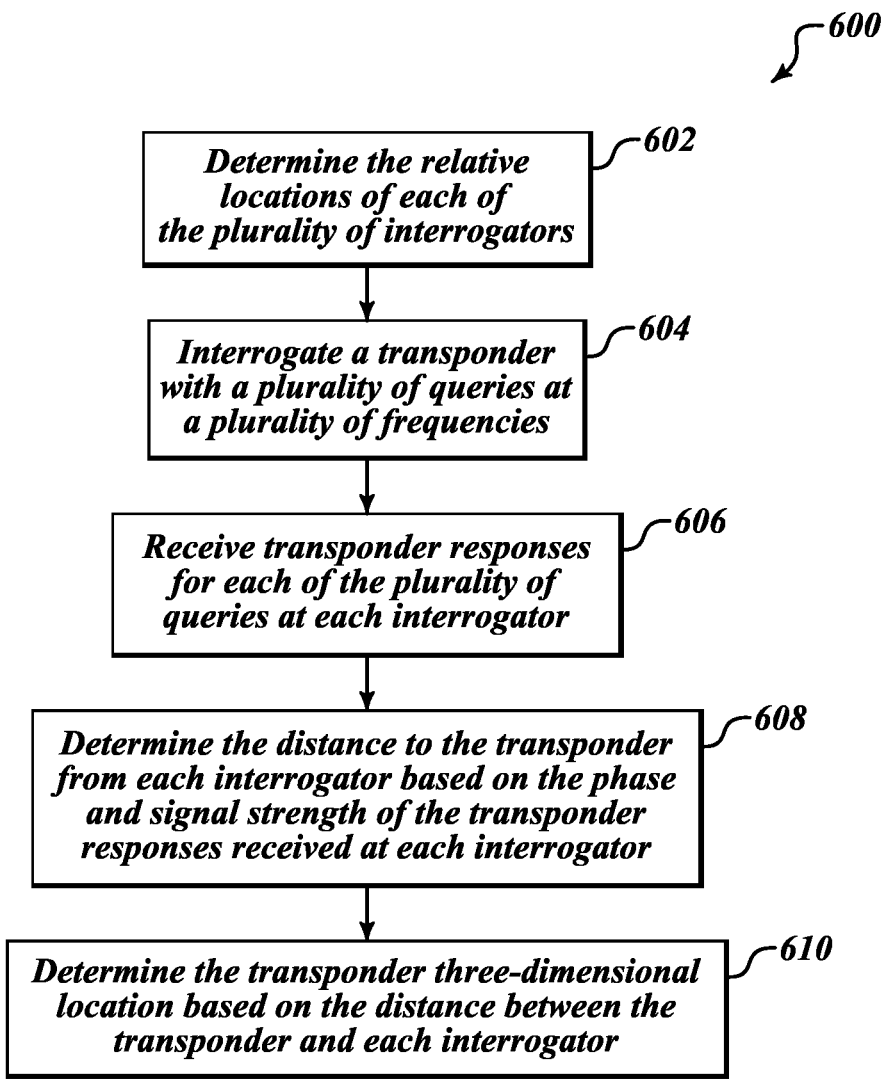
FIG. 6 is a high level flow diagram showing a method of operating an interrogation system including a plurality of interrogators or readers similar to that of FIG. 6, according to one illustrated embodiment.

FIG. 6 shows a method 600 of operating an interrogation system similar or identical to that of FIG. 5, according to one illustrated embodiment.

At 602, the interrogation system determines the relative locations of each of the readers in the interrogation system. The locations may be entered in manually, the locations may be determined via global positioning systems, the locations may be determined via wires interconnecting the readers, i.e., time domain reflectometry, or by transmitting signals back and forth between readers while taking turns acting as transponders or tags.

At 604, each reader in the interrogation system interrogates the transponder with a plurality of queries over a plurality of frequencies. Alternatively, a single reader may transmit a plurality of queries on behalf of all of the readers of the interrogation system. Each reader may transmit queries using baseband frequencies unique to each reader to assist each reader in distinguishing responses to queries transmitted by each reader. Alternatively, each reader may encode a reader-unique identifier in the transmitted queries, for example to temporarily silence all but a desired one of the transponder from responding.

At 606, each reader receives transponder responses to the queries transmitted by each reader in the interrogation system.

At 608, the interrogation system determines the relative distance between each reader and the transponder based on the phase and signal strength of the received transponder responses. The distance may be determined using the technique described with respect to method 200.

At 610, the transponder system determines a three-dimensional location of the transponder based on the distance between each reader and the transponder. The three-dimensional location may be determined using techniques such as triangulation. The transponder system may use the three-dimensional location of the transponder to determine the speed and the bearing of the transponder.

Figure 7:
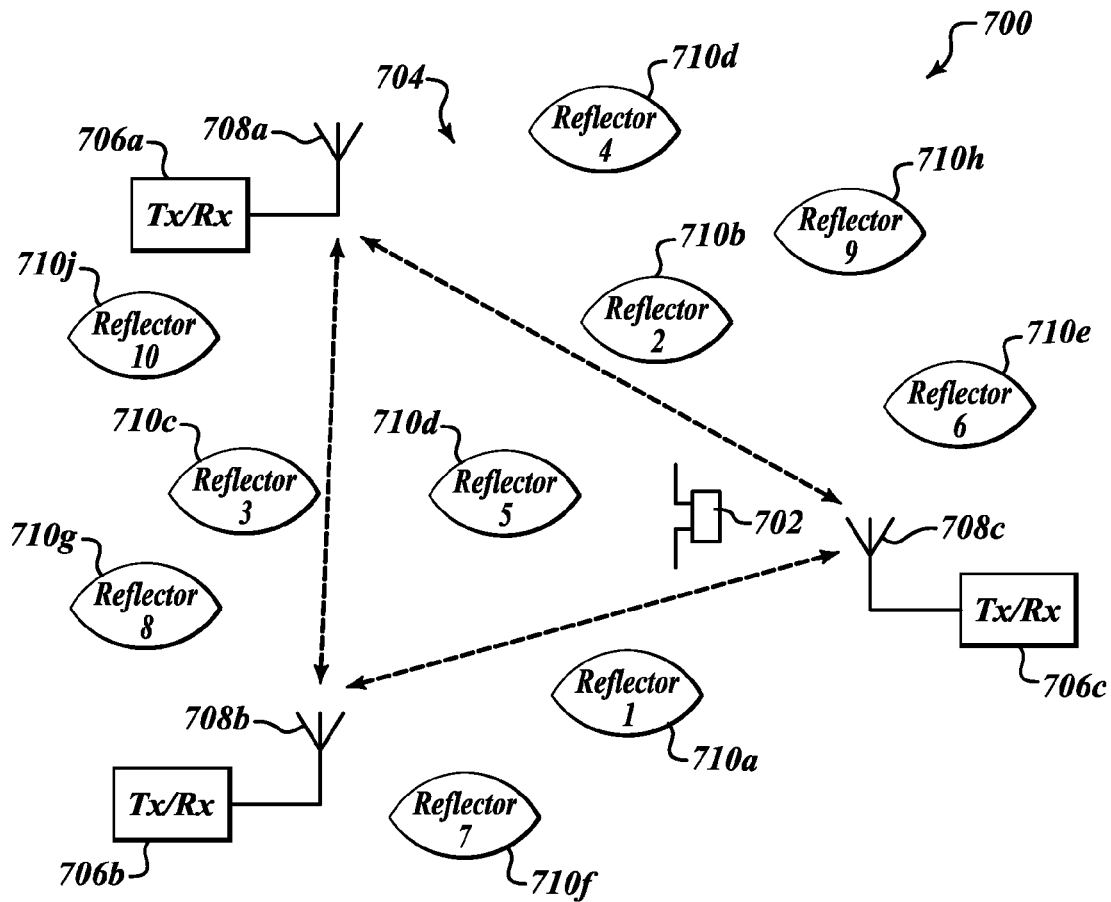
FIG. 7 is a diagram of a plurality of interrogators or readers performing reader-to-reader communication, according to one illustrated embodiment.

FIG. 7 shows an interrogation system 700 including a plurality of interrogators or readers 706a-706c (collectively 706) and operable to interrogate a transponder 702 in a range or field 704 of a plurality of interrogators or readers 706. The readers 706 may be individually coupled to respective antennas 708a-708c (collectively 708) to transmit queries and responses between the readers 706, as well as to and from transponder 702.

The field 704 may include one or more sources of multipath interference, denominated herein as reflectors 710a-710j (collectively 710). The reflectors represent various potential sources of multipath interference which may distort RF signals transmitted between readers 706. While ten reflectors 710 are illustrated, the field 704 may contain any number of reflectors, even no reflectors. The number and/or location or positions of the reflectors may not be known a priori. The readers 706 are operable to wirelessly transmit signals to one or more transponders, but the readers 706 typically will not have an a priori knowledge of the number and or location or position of the transponders.

Each reader 706 may transmit queries and responses between each other reader 706 to determine the location of each reader 706 relative to each other reader 706. The readers 706 may also transmit acquired information regarding any transponders that may exist in the field 704.

Figure 8:
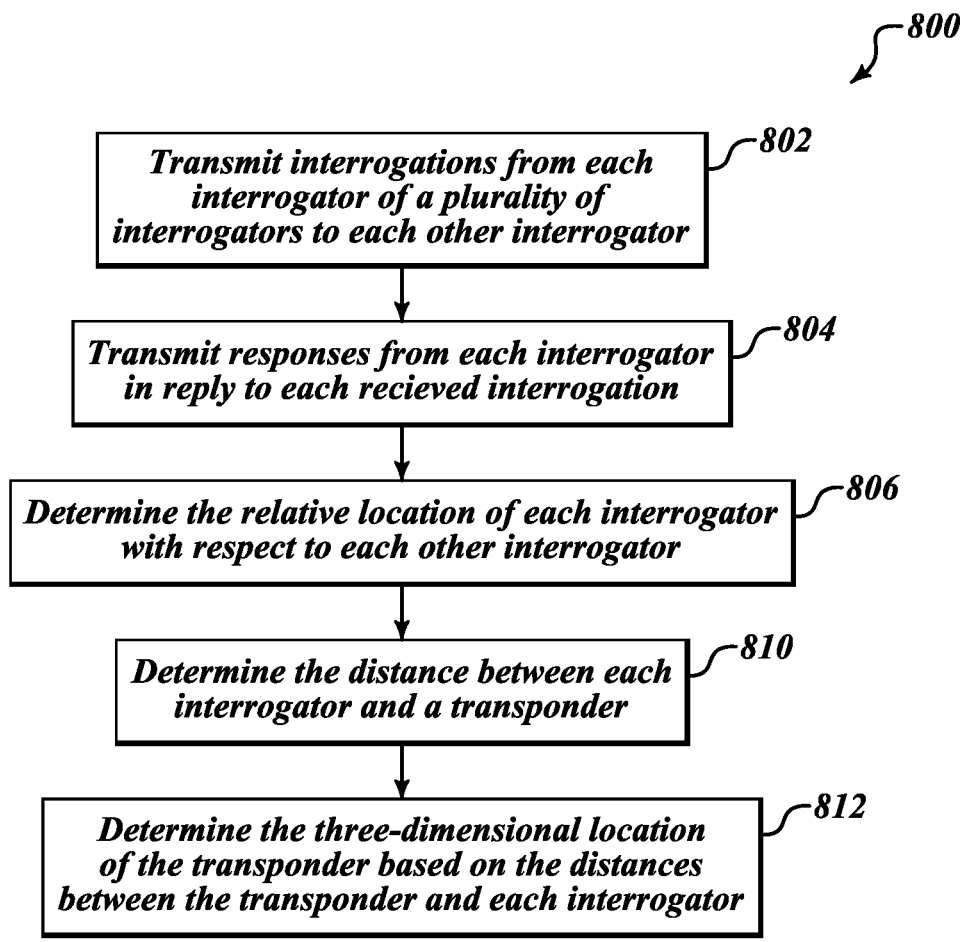
FIG. 8 is a high level flow diagram showing a method of operating a plurality of interrogators or readers similar to that of FIG. 7, without a priori knowledge of each interrogators' location, according to one illustrated embodiment.

FIG. 8 shows a method 800 of operating an interrogation system including multiple interrogators or readers similar to that illustrated in FIG. 7, according to one illustrated embodiment where the location of each reader relative to each other reader may not be known a priori. As discussed in more detail below, reader-to-reader communication may be used to determine the location of each reader relative to each other reader. During the reader-to-reader communication, each reader may take turns responding to each other reader as if the reader were a transponder or RFID tag.

At 802, each reader transmits queries to each other reader. Each reader may transmit queries to each other reader by modifying the techniques described in method 200 so that each queried reader responds as if it were a transponder or RFID tag. The reader-to-reader query may include: an ID of the transmitting reader, a command, the date, the time, a priority level of the transmission, or the like. The information may be modulated onto the baseband frequency using amplitude shift keying, binary shift keying, frequency shift keying, or the like. Alternatively, the reader-to-reader query may be transmitted in a manner that is too weak to power up a transponder, thereby only enabling other readers to respond.

At 804, each reader transmits responses to queries received from each other reader. For simplicity, each reader may respond to a reader-to-reader query by entering transponder mode. In transponder mode, each reader may respond to a reader-to-reader query as if the reader were a transponder. In particular, each reader may respond to a reader-to-reader query by modulating the response between a first impedance state and a second impedance state. Additionally, each reader may modulate the response to include: an ID of the responding reader, the date, the time, or other information to facilitate reader-to-reader communication.

At 806, the interrogation system determines the relative location of each reader with respect to each other reader based on the determined distance between each of the readers. The distances between each of the readers may be determined based on the responses of each reader by using the techniques described in connection with method 200.

At 810, the interrogation system determines the distance between each reader and a transponder in accordance with the technique described in method 200.

At 812, the transponder system determines a three-dimensional location of the transponder based on the distance between each reader and the transponder. The three-dimensional location may be determined using techniques such as triangulation. According to one embodiment, the transponder system may use the three-dimensional location of the transponder to determine the speed and the bearing of the transponder.

Figure 9:
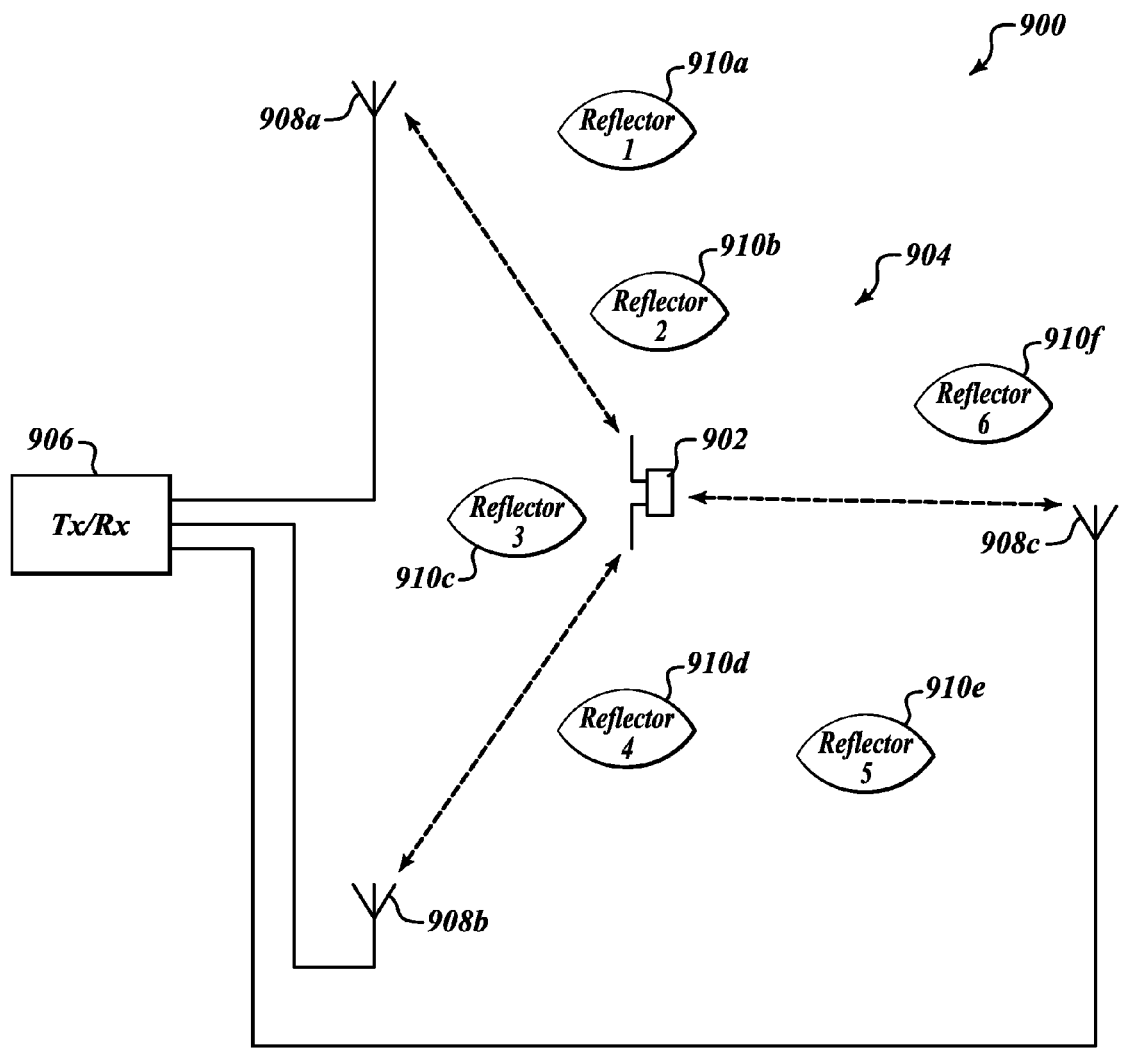
FIG. 9 is a schematic diagram of an interrogator or reader interrogating a transponder through a plurality of antennas, according to one illustrated embodiment.

FIG. 9, shows an interrogation system 900 including an interrogator or reader 906 and operable to interrogate a transponder 902 in a range or field 904 in which one or more reflectors 910a-910f (collectively 910) may exist. While only one transponder 902 is illustrated, in typical applications there may be many more transponders 902 in the field 904. Similarly, while only six reflectors 910 are illustrated, the field 904 may contain any number of reflectors 910, even no reflectors. The number and/or location or positions of the reflectors 910 may not be known a priori. The interrogator or reader 902 is operable to wirelessly transmit a signal to the transponder 902, but does not have an a priori knowledge of the distance or location of transponder 902 in the field 904

The interrogator 906 may be connected to multiple antennas 908a-908c (collectively 908) positioned within the field 904. While three antennas 908 are illustrated, more antennas 908 may be connected to the interrogator 906. The antennas 908 may be equidistantly positioned around the field 904 to improve coverage of the field 904 and to improve ranging accuracy.

The locations of the antennas 908 may be not be known a priori. If the location of each antenna 908 is not known, the locations may be determined using the technique described in method 800.

The three-dimensional location of the transponder 902 may be determined using the techniques described above in connection with other embodiments. Accordingly, the range, speed, and bearing of the transponder 902 with respect to antennas 908 may be determined using interrogation system 900.

The various embodiments described above can be combined to provide further embodiments. Aspects of the embodiments can be modified, to provide yet further embodiments. For example, the techniques described above may also be applied to time domain phase difference of arrival estimation and spatial domain phase difference of arrival estimation.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An interrogation system to wirelessly interrogate wireless transponders, comprising:
at least one antenna;
a transmitter communicatively coupled to the at least one antenna and operable to transmit interrogation signals at each of a plurality of frequencies in a wireless communications frequency band;
a receiver communicatively coupled to the at least one antenna to receive responses to the interrogation signals; and
a controller communicatively coupled with the transmitter and the receiver and configured to:
determine a first and a second derivative of signal strength of the received responses with respect to frequency over at least two of the frequencies,
determine a first and a second derivative of phase of the received responses with respect to frequency over at least two of the frequencies, and
determine at least one of a distance between the at least one antenna and a wireless transponder that responds to the interrogation signals, a bearing of the wireless transponder with respect to the at least one antenna or a speed based at least in part on the determined first and the determined second derivatives of signal strength of the received responses with respect to frequency and the determined first and the determined second derivatives of phase of the received responses with respect to frequency.

2. The interrogation system of claim 1 wherein there is only a single antenna and the transmitter and the receiver are both communicatively coupled to the single antenna.

3. The interrogation system of claim 1 wherein the controller is further configured to determine a magnitude of the responses based on at least one of a maximum and a minimum signal strength of the received responses.

4. The interrogation system of claim 3 wherein the controller is configured to estimate the at least one of the maximum and the minimum signal strength of the received responses by construction of an Nth-order polynomial approximation of a function of signal strength of the received responses with respect to the plurality of frequencies.

5. The interrogation system of claim 1 wherein the controller is configured to use an alternating current component from each response to determine an in-phase component and a quadrature component, and the first and the second derivative of phase is based on a difference between the quadrature components of at least two responses divided by the in-phase components of the at least two responses.

6. The interrogation system of claim 1 wherein the controller is further configured to determine a distance of the at least one antenna from at least one source of multipath.

7. The interrogation system of claim 6 wherein the controller determines a difference between a direct distance from the at least one antenna to the transponder and an indirect distance from the at least one antenna to the transponder, the indirect distance including a distance from the at least one antenna to the at least one source of multipath and a distance from the at least one source of multipath to the transponder.

8. The interrogation system of claim 1 wherein the controller is configured to determine a phase error in the distance determination between the at least one antenna and the wireless transponder.

9. The interrogation system of claim 8 wherein the controller is configured to account for at least one source of multipath that is nearest a direct path between the at least one antenna and the wireless transponder and configured to disregard any other sources of multipath interference to compensate for the error in the distance determination between the at least one antenna and the wireless transponder.

10. The interrogation system of claim 1 wherein the controller is configured to determine the distance between the at least one antenna and the wireless transponder.

11. The interrogation system of claim 1, comprising:
a plurality of interrogators, wherein each of the plurality of interrogators is configured to communicate with each other interrogator of the plurality of interrogators and the plurality of interrogators is configured to determine the bearing or the speed of the transponder.

12. The interrogation system of claim 11 wherein communication between interrogators includes a first interrogator of the plurality of interrogators responding to a query made by a second interrogator of the plurality of interrogators as if the first interrogator were a second transponder.

13. The interrogation system of claim 1 wherein the interrogation system includes a single interrogator, wherein the at least one antenna is a plurality of antennas.

14. A method of operating an interrogation system, comprising:
transmitting interrogation signals from at least one antenna at each of a plurality of frequencies in a wireless communications frequency band;
receiving responses to the interrogation signals at the at least one antenna;
determining a first and a second derivative of signal strength of the received responses with respect to frequency over at least two of the frequencies by a control subsystem;
determining a first and a second derivative of phase of the received responses with respect to frequency over at least two of the frequencies by the control subsystem; and
determining by the control subsystem at least one of a distance between the at least one antenna and a wireless transponder that responds to the interrogation signals, a bearing of the wireless transponder with respect to the at least one antenna or a speed based at least in part on the determined first and the determined second derivatives of signal strength of the received responses with respect to frequency and the determined first and the determined second derivatives of phase of the received responses with respect to frequency.

15. The method of claim 14, further comprising:
filtering a direct current component from each of the received response and determining an in-phase component and a quadrature component of an alternating current component of each received response, wherein determining the first and second derivatives of phase includes based at least in part on the in-phase component and the quadrature component.

16. The method of claim 14, further comprising:
determining by the control subsystem whether a maximum signal strength and a minimum signal strength is measurable within the plurality of frequencies and determining a relative magnitude of a reflected interrogation signal reflected by a source of multipath interference if the maximum and the minimum is measurable.

17. The method of claim 14 wherein determining the first and the second derivative of phase of the received responses with respect to frequency includes determining a difference between a direct distance from the antenna to the transponder and an indirect distance from the antenna to the transponder via a source of multipath interference.

18. The method of claim 17 wherein determining the difference between the direct distance and the indirect distance is performed.

19. The method of claim 14, further comprising: determining by the control subsystem at least one of the frequencies where a phase term kΔd is one of 0+2*Pi*M, Pi/2+2*Pi*M, Pi+2*Pi*M, or 3*Pi/2+2*Pi*M, wherein M is an integer, k=2*Pi/c, wherein c is the speed of light, and Δd is difference between the distance between the at least one antenna and the wireless transponder and an indirect distance between the at least one antenna and the wireless transponder which includes a source of multipath interference.

20. The method of claim 18, further comprising:
determining by the control subsystem at least two of the following where a phase term is one of 0+2*Pi*M, Pi/2+2*Pi*M, Pi+2*Pi*M, or 3*Pi/2+2*Pi*M, wherein M is an integer: the second derivative of phase, a third derivative of phase, a first derivative of signal strength divided by signal strength, and a second derivative of signal strength divided by a first derivative of signal strength.

* * * * *